United States Patent [19]

Peter

[11] Patent Number: 5,496,107

[45] Date of Patent: Mar. 5, 1996

[54] METHOD FOR PRODUCING A BASE MIXTURE OF RUBBER

[75] Inventor: Julius Peter, Dommayergasse 7/13, A-1130 Vienna, Austria

[73] Assignees: Julius Peter, Vienna, Austria; Continental Aktiengesellschaft, Hanover, Germany

[21] Appl. No.: 390,942

[22] Filed: Feb. 17, 1995

Related U.S. Application Data

[62] Division of Ser. No. 221,411, Mar. 30, 1994.

[30] Foreign Application Priority Data

Mar. 30, 1993 [DE] Germany ............... 43 14 706.2

[51] Int. Cl.⁶ .................. B29B 7/18; B29B 13/04
[52] U.S. Cl. .................. 366/91; 366/97
[58] Field of Search .............. 366/75–77, 83–86, 366/91, 96, 97, 297–301; 425/203, 204, 205, 208, 209; 264/28, 40.6, 68, 211.23, 211.24, 349; 523/346, 348, 351

[56] References Cited

U.S. PATENT DOCUMENTS

| | | | |
|---|---|---|---|
| 2,351,706 | 6/1944 | Robinson | 366/76 |
| 3,563,514 | 2/1971 | Shattuck | 425/205 X |
| 3,609,828 | 10/1971 | Compa et al. | 425/205 X |
| 3,913,796 | 10/1975 | Aoki | 425/203 X |
| 4,090,829 | 5/1978 | Fischer et al. | 425/205 X |
| 4,125,208 | 11/1978 | Bettermann | 425/203 X |
| 4,127,372 | 11/1978 | Perla et al. | 425/205 X |
| 4,161,419 | 7/1979 | Alia | 523/351 X |
| 4,792,424 | 12/1988 | Loman | 425/205 X |
| 4,910,237 | 3/1990 | Peter | 523/351 |
| 5,011,291 | 4/1991 | Peter | 366/91 |
| 5,108,188 | 4/1992 | Peter et al. | 366/91 |
| 5,183,640 | 2/1993 | Peter et al. | 366/91 X |
| 5,251,977 | 10/1993 | Peter et al. | 366/91 |

*Primary Examiner*—Charles E. Cooley
*Attorney, Agent, or Firm*—Robert W. Becker & Associates

[57] ABSTRACT

An apparatus for preparing rubber mixtures has a ram mixer for mixing rubber and non-reactive additives to form a rubber base mixture and a ramless mixer for finely dispersing the non-reactive additives within the rubber base mixture. The ramless mixer is positioned below the ram mixer and connected to the ram mixer such that the rubber base mixture is directly introduced into the ramless mixer for finely dispersing the non reactive additives. Accordingly, in a ram mixer a batch of rubber and non-reactive additives is mixed to form a rubber base mixture. The rubber base mixture is transferred into the ramless mixer. The ramless mixer serves to finely disperse the non-reactive additives within the rubber base mixture. The rubber mixture with the finally dispersed non-reactive additives is then conveyed to a second mixing stage. In the second mixing stage reactive additives are added and the rubber base mixture together with the reactive additives is finishing-mixed to form a finished rubber mixture.

1 Claim, 1 Drawing Sheet

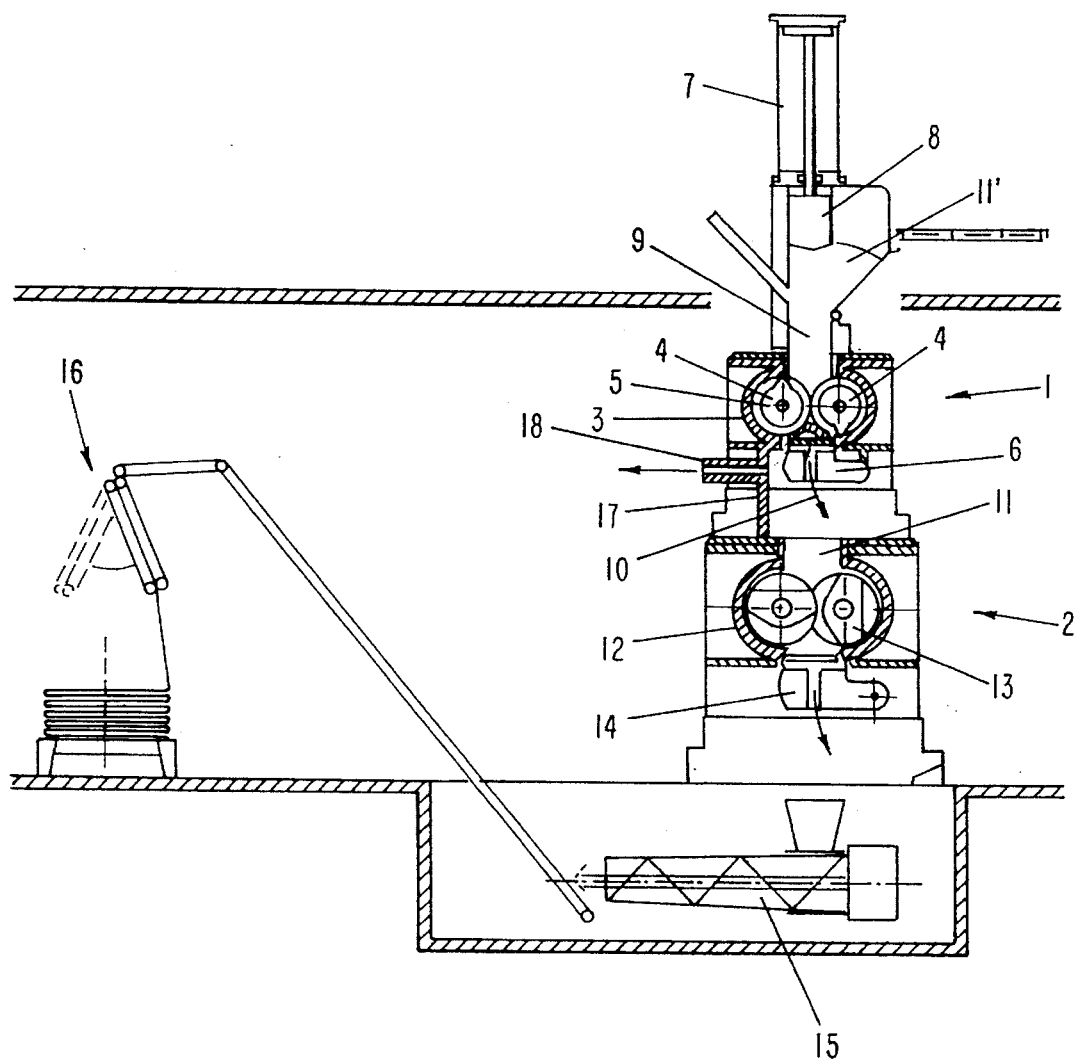

METHOD FOR PRODUCING A BASE MIXTURE OF RUBBER

This application is a division of abandoned application Ser. No. 08/221,411, filed Mar. 30, 1994.

BACKGROUND OF THE INVENTION

The present invention relates to a device with a ram mixer for mixing rubber and non-reactive additives. Such a device is commonly arranged upstream of a device for finishing-mixing the rubber base mixture where to the rubber base mixture reactive additives are added.

Ram mixers have advantageously been used in modern mixing plants; however, they have considerable disadvantages. Rubber mixtures, in general, contain volatile components which cannot be removed where processes are performed in closed systems. This is, for example, the case for ram mixers (kneaders). During the further production steps at higher temperatures, for example, on the calender rollers, within an injection molding machine at the calender, or in the case of incomplete vulcanization, the volatile components have the tendency to emerge from the rubber. This is noticeable by the formation of detrimental vapors and/or in a porosity of the semi-finished product or the finished vulcanized product.

It is therefore an object of the present invention to improve the aforementioned device such that despite the use of a closed system in the form of a ram mixer porosity and vapors are at least substantially eliminated.

BRIEF DESCRIPTION OF THE DRAWING

This object, and other objects and advantages of the present invention, will appear more clearly from the following specification in conjunction with the accompanying only drawing in which a device for preparing a rubber base mixture from rubber and non-reactive additives is shown in vertical cross-section.

SUMMARY OF THE INVENTION

The apparatus for preparing rubber mixtures according to the present invention is primarily characterized by:

A ram mixer for mixing rubber and non-reactive additives to form a rubber base mixture;

A ramless mixer for finishing-mixing the rubber base mixture; and

The ramless mixer positioned under the ram mixer and connected to the ram mixer such that the rubber base mixture is directly introduced into the ramless mixer for finely dispersing the non-reactive additives.

Preferably, the ramless mixer has a suction device for removing volatile substances emerging from the rubber base mixture.

Expediently, the ram mixer has an outlet opening and the ramless mixer has an inlet opening, further comprising a channel connecting the outlet opening to the inlet opening. The channel is substantially air-tight and has at least one suction line for removing volatile substances emerging from the rubber base mixture.

Preferably, the ram mixer and the ramless mixer form a unitary device.

Advantageously, the ram mixer has a first mixing chamber and the ramless mixer has a second mixing chamber, the second mixing chamber being substantially greater than the first mixing chamber. Preferably, the second mixing chamber is 30 to 70% greater than the first mixing chamber.

The present invention also relates to a method for producing a rubber mixture. The inventive method is primarily characterized by the following steps:

Mixing in a ram mixer in a batchwise operation rubber and non-reactive additives to form a rubber base mixture;

Transferring the rubber base mixture into a ramless mixer;

Finally dispersing with the ramless mixer the non-reactive additives within the rubber base mixture;

Conveying the rubber base mixture containing the finely dispersed non reactive additives to a second mixing stage;

In the second mixing stage adding reactive additives to the rubber base mixture containing the finely dispersed non-reactive additives; and Finishing-mixing the rubber base mixture containing the finely dispersed non-reactive additives and the reactive additives to form a finished rubber mixture.

Preferably, the method further comprises the step of cooling the rubber base mixture in the ramless mixer.

According to the present invention, it is suggested to arrange below the ram mixer (kneader) a ramless mixer which is connected to the ram mixer such that the rubber base mixture containing non-reactive additives is directly introduced into the ramless mixer for finally dispersing the non-reactive additives whereby preferably between the outlet opening of the ram mixer and the inlet opening of the ramless mixer a channel is arranged which has coordinated therewith a suction device.

Such a connection between a ram mixer and a ramless mixer for producing rubber base mixtures has considerable advantages.

The fine-dispersing step for the non-reactive additives within an advantageous inner mixer with an open system allows for the removal of volatile components without any further expenditure, whereby these components can be completely removed when a vacuum is applied. This advantage is especially important with respect to occupational health considerations.

Due to the connection of the aforementioned mixers for the production of rubber base mixtures the entire mixing process is shortened and intensified. Since, in general, after approximately ⅔ of the mixing time the non-reactive additives are completely absorbed by the elastomers, the fine dispersion of the non-reactive additives can take place within the ramless mixer in parallel to the manufacture of the next batch of rubber base mixture within the ram mixer. This not only allows for saving time, but also results in a lowering of the temperature causing a higher energy absorption and thus a more intensive mixing effect.

DESCRIPTION OF PREFERRED EMBODIMENTS

The present invention will now be described in detail with the aid of several specific embodiments utilizing the only FIGURE.

The inventive apparatus has an upper part 1 and a lower part 2. The upper part 1 is essentially in the form of a ram mixer 3 with two rotors 4 which are positioned in a mixing chamber 5 that is provided with a downwardly pivotable saddle 6. The mixing chamber 5 has an inlet opening 9 which can be closed off by a ram 8 that can be moved by a working cylinder 7. In a manner known per se, the saddle 6 can be pivoted about a horizontal axis from the closed position according to the drawing in the direction of arrow 10 downwardly where it assumes a substantially vertical position. In this position, the saddle 6 frees the outlet opening of the mixing chamber 5. In the area of the ram 8 inlets (funnels 11') for the rubber and the non-reactive additives such as oil, chemicals, and fillers are provided.

The outlet opening of the mixing chamber 5 is positioned vertically above the inlet opening 11 of the mixing chamber 12 of the lower part 2 of the apparatus which is in the form of a ramless mixer having rotors 13. The inlet opening 11 is thus not provided with a closure element. The outlet opening of the ramless mixer is closed by a saddle 14. By pivoting this saddle downwardly, the outlet opening of the mixing chamber 12 is freed.

Vertically below this outlet opening an extruder 15 is positioned which places the band of rubber material formed by it onto the device 16.

It is furthermore important that the free-fall distance of the rubber worked within the mixing chamber 5 into the inlet opening 11 is laterally closed off by a channel. The channel wall with vertical extension is represented at 17. In order to allow for a suction effect within the space enclosed by the channel, a suction device 18 is provided.

As can be seen in the drawing, the ramless mixer of the lower part 2 in comparison to the ram mixer in the upper part 1 is substantially greater by volume. For example, its mixing chamber 12 is approximately 30 to 70% greater by volume. However, the operational rpm range is substantially smaller. For these reasons, the ramless mixer allows for a cooling of the base mixture when transferred from the ram mixer into the ramless mixer.

After completion of mixing of a batch of rubber and non-reactive additives within the ram mixer, the saddle 6 is pivoted. Thus, the contents of the mixing chamber 5 is transferred between the two mixers through the channel that connects the inlet opening 11 to the outlet opening of the mixing chamber 5. Within the mixing chamber 12 a temperature lowering and a fine dispersion of the additives takes place, while at the same time in the ram mixer a new batch is processed.

The volatile components which emerge during mixing within the ram mixer cannot be removed freely due to the presence of the channel above the inlet opening 11 and the thus provided enclosed space. The components must be removed by the suction line 18. This process is referred to as a so-called on line degassing.

After finishing the working cycle within the ramless mixer, the saddle 14 is opened and the contents of the mixing chamber is directly transferred to the machine (extruder 15) arranged downstream. At the same time the batch that has been processed in the ram mixer, is directly transferred into the ramless mixer while the ram mixer is again supplied with rubber and non-reactive additives.

The thus prepared base mixture is further processed in a second mixing stage, either directly via the extruder 15 or after intermediate storage to produce a finished rubber mixture by adding thereto and mixing in reactive additives.

Since the ramless mixer, as mentioned before, is substantially greater than the upstream ram mixer and is furthermore operated at lower rpms, the base mixture is thus cooled within the ramless mixer so that the mixing effect is improved and the energy absorption is increased.

The present invention is, of course, in no way restricted to the specific disclosure of the specification and drawings, but also encompasses any modifications within the scope of the appended claims.

What is claimed is:

1. A method for producing a rubber mixture, said method comprising the steps of:

mixing in a ram mixer in a batchwise operation rubber and non-reactive additives to from a rubber base mixture;

transferring the rubber base mixture into a ramless mixer;

cooling the rubber base mixture in the ramless mixer and finely dispersing with the ramless mixer the non-reactive additives within the rubber base mixture;

introducing the rubber base mixture into an extruder;

conveying the rubber base mixture containing the finely dispersed non-reactive additives with the extruder to a second mixing stage;

in the second mixing stage adding reactive additives to the rubber base mixture containing the finely dispersed non-reactive additives; and finishing-mixing in the second mixing stage the rubber base mixture containing the finely dispersed non-reactive additives and the reactive additives to form a finished rubber mixture.

* * * * *